US008725665B2

(12) United States Patent
Anderson et al.

(10) Patent No.: US 8,725,665 B2
(45) Date of Patent: May 13, 2014

(54) METRICS MONITORING AND FINANCIAL VALIDATION SYSTEM (M2FVS) FOR TRACKING PERFORMANCE OF CAPITAL, OPERATIONS, AND MAINTENANCE INVESTMENTS TO AN INFRASTRUCTURE

(75) Inventors: Roger N. Anderson, New York, NY (US); Albert Boulanger, New York, NY (US); Leon Wu, New York, NY (US); Serena Lee, Holmdel, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 13/589,737

(22) Filed: Aug. 20, 2012

(65) Prior Publication Data
US 2013/0073488 A1    Mar. 21, 2013

Related U.S. Application Data

(63) Continuation of application No. PCT/US2011/026056, filed on Feb. 24, 2011.

(60) Provisional application No. 61/307,792, filed on Feb. 24, 2010.

(51) Int. Cl.
*G06F 15/18* (2006.01)

(52) U.S. Cl.
USPC ............... 706/12; 700/291; 705/7.11; 714/37

(58) Field of Classification Search
None
See application file for complete search history.

(56) References Cited

U.S. PATENT DOCUMENTS 5,225,712 A    7/1993  Erdman
5,625,751 A    4/1997  Brandwajn et al.
(Continued)

FOREIGN PATENT DOCUMENTS

| EP | 2 377 217 | 10/2011 |
|----|-----------|---------|
| WO | WO 93/03401 | 2/1993 |
| WO | WO 2007/087537 | 2/2007 |
| WO | WO 2007/136456 | 11/2007 |

OTHER PUBLICATIONS

Implementing Service Model Visualizations, Andreas Lundgren, Jun. 8, 2009, Institutionen för informatikm, Systemvetenskapliga programmet med inriktning mot design, interaktion och innovation. Examensarbete på kandidatnivå, 15 hp.*
U.S. Appl. No. 12/885,800, Feb. 21, 2013 Final Office Action.

(Continued)

*Primary Examiner* — Kakali Chaki
*Assistant Examiner* — Luis Sitiriche
(74) *Attorney, Agent, or Firm* — Baker Botts LLP

(57) ABSTRACT

Techniques for evaluating the accuracy of a predicted effectiveness of an improvement to an infrastructure include collecting data, representative of at least one pre-defined metric, from the infrastructure during first and second time periods corresponding to before and after a change has been implemented, respectively. A machine learning system can receive compiled data representative of the first time period and generate corresponding machine learning data. A machine learning results evaluator can empirically analyze the generated machine learning data. An implementer can implement the change to the infrastructure based at least in part on the data from a machine learning data outputer. A system performance improvement evaluator can compare the compiled data representative of the first time period to that of the second time period to determine a difference, if any, and compare the difference, if any, to a prediction based on the generated machine learning data.

20 Claims, 10 Drawing Sheets

(56) References Cited

U.S. PATENT DOCUMENTS

| | | |
|---|---|---|
| 5,764,155 A | 6/1998 | Kertesz et al. |
| 5,862,391 A | 1/1999 | Salas et al. |
| 5,875,431 A | 2/1999 | Heckman et al. |
| 5,893,069 A | 4/1999 | White et al. |
| 5,959,547 A | 9/1999 | Tubel et al. |
| 5,963,457 A | 10/1999 | Kano et al. |
| 6,012,016 A | 1/2000 | Bilden et al. |
| 6,055,517 A | 4/2000 | Friend et al. |
| 6,125,044 A | 9/2000 | Cherniski et al. |
| 6,125,453 A | 9/2000 | Wyss |
| 6,154,731 A | 11/2000 | Monks et al. |
| 6,169,981 B1 | 1/2001 | Werbos |
| 6,219,650 B1 | 4/2001 | Friend et al. |
| 6,266,619 B1 | 7/2001 | Thomas et al. |
| 6,308,162 B1 | 10/2001 | Ouimet et al. |
| 6,311,144 B1 | 10/2001 | Abu El Ata |
| 6,321,205 B1 | 11/2001 | Eder |
| 6,434,435 B1 | 8/2002 | Tubel et al. |
| 6,519,568 B1 | 2/2003 | Harvey et al. |
| 6,581,045 B1 | 6/2003 | Watson |
| 6,629,044 B1 | 9/2003 | Papallo, Jr. et al. |
| 6,772,211 B2 | 8/2004 | Lu et al. |
| 6,807,537 B1 | 10/2004 | Thiesson et al. |
| 6,826,483 B1 | 11/2004 | Anderson et al. |
| 6,829,384 B2 | 12/2004 | Schneiderman et al. |
| 6,944,678 B2 | 9/2005 | Lu et al. |
| 6,963,793 B2 | 11/2005 | Yamada et al. |
| 7,106,045 B2 | 9/2006 | Jungwirth et al. |
| 7,127,584 B1 | 10/2006 | Thompson et al. |
| 7,130,832 B2 | 10/2006 | Bannai et al. |
| 7,132,623 B2 | 11/2006 | De Miranda et al. |
| 7,233,843 B2 | 6/2007 | Budhraja et al. |
| 7,236,953 B1 | 6/2007 | Cooper et al. |
| 7,243,081 B2 | 7/2007 | Friend et al. |
| 7,274,975 B2 | 9/2007 | Miller |
| 7,369,950 B2 | 5/2008 | Wall et al. |
| 7,395,252 B2 | 7/2008 | Anderson et al. |
| 7,467,119 B2 | 12/2008 | Saidi et al. |
| 7,519,506 B2 | 4/2009 | Trias |
| 7,555,454 B2 | 6/2009 | Cooper et al. |
| 7,590,472 B2 | 9/2009 | Hakim et al. |
| 7,873,567 B2 | 1/2011 | Eder |
| 7,925,557 B1 | 4/2011 | Ficery et al. |
| 7,945,524 B2 | 5/2011 | Anderson et al. |
| 8,036,996 B2 | 10/2011 | Long et al. |
| 8,116,915 B2 | 2/2012 | Kempton |
| 8,305,737 B2 | 11/2012 | Ewing et al. |
| 2001/0049651 A1 | 12/2001 | Selleck |
| 2002/0001307 A1 | 1/2002 | Nguyen et al. |
| 2002/0084655 A1 | 7/2002 | Lof et al. |
| 2002/0087234 A1 | 7/2002 | Lof et al. |
| 2002/0198627 A1 | 12/2002 | Nasman et al. |
| 2003/0130755 A1 | 7/2003 | Bazzocchi et al. |
| 2003/0171851 A1 | 9/2003 | Brickfield et al. |
| 2003/0188208 A1 | 10/2003 | Fung |
| 2004/0143477 A1 | 7/2004 | Wolff |
| 2004/0158417 A1 | 8/2004 | Bonet |
| 2004/0158772 A1 | 8/2004 | Pan et al. |
| 2004/0163895 A1 | 8/2004 | Kostka et al. |
| 2004/0267395 A1 | 12/2004 | Discenzo et al. |
| 2005/0033707 A1 | 2/2005 | Ehlers et al. |
| 2005/0034023 A1 | 2/2005 | Maturana et al. |
| 2005/0207081 A1 | 9/2005 | Ying |
| 2006/0106797 A1 | 5/2006 | Srinivasa et al. |
| 2006/0168398 A1 | 7/2006 | Cadaret |
| 2006/0185756 A1 | 8/2006 | Sato et al. |
| 2006/0200400 A1 | 9/2006 | Hunter et al. |
| 2006/0259199 A1 | 11/2006 | Gjerde et al. |
| 2006/0288260 A1 | 12/2006 | Xiao et al. |
| 2007/0094187 A1 | 4/2007 | Anderson et al. |
| 2007/0177508 A1 | 8/2007 | Croak et al. |
| 2007/0192078 A1 | 8/2007 | Nasle et al. |
| 2007/0198108 A1 | 8/2007 | Nair et al. |
| 2007/0228843 A1 | 10/2007 | Radley |
| 2007/0271006 A1 | 11/2007 | Golden et al. |
| 2008/0039980 A1 | 2/2008 | Pollack et al. |
| 2008/0109205 A1 | 5/2008 | Nasle |
| 2008/0126171 A1 | 5/2008 | Baldwin et al. |
| 2008/0167756 A1 | 7/2008 | Golden et al. |
| 2008/0177678 A1 | 7/2008 | Di Martini et al. |
| 2008/0183339 A1 | 7/2008 | Vaswani et al. |
| 2008/0250265 A1 | 10/2008 | Chang et al. |
| 2008/0281663 A1 | 11/2008 | Hakim et al. |
| 2008/0294387 A1 | 11/2008 | Anderson et al. |
| 2008/0313006 A1 | 12/2008 | Witter et al. |
| 2008/0319923 A1 | 12/2008 | Casey et al. |
| 2009/0031241 A1 | 1/2009 | Castelli et al. |
| 2009/0063094 A1 | 3/2009 | Havener et al. |
| 2009/0063122 A1 | 3/2009 | Nasle |
| 2009/0076749 A1 | 3/2009 | Nasle |
| 2009/0113049 A1 | 4/2009 | Nasle et al. |
| 2009/0157573 A1 | 6/2009 | Anderson et al. |
| 2009/0178089 A1 | 7/2009 | Picco et al. |
| 2009/0187285 A1 | 7/2009 | Yaney et al. |
| 2009/0240380 A1 | 9/2009 | Shah et al. |
| 2010/0106641 A1 | 4/2010 | Chassin et al. |
| 2010/0107173 A1 | 4/2010 | Chassin |
| 2010/0114387 A1 | 5/2010 | Chassin |
| 2010/0169226 A1 | 7/2010 | Lymbery et al. |
| 2010/0185557 A1 | 7/2010 | Hunter et al. |
| 2010/0207728 A1 | 8/2010 | Roscoe et al. |
| 2010/0306014 A1 | 12/2010 | Chow |
| 2010/0332373 A1 | 12/2010 | Crabtree et al. |
| 2011/0172973 A1 | 7/2011 | Richards et al. |
| 2011/0175750 A1 | 7/2011 | Anderson et al. |
| 2011/0231213 A1 | 9/2011 | Anderson et al. |
| 2011/0264276 A1 | 10/2011 | Kressner et al. |
| 2011/0282703 A1 | 11/2011 | Chow et al. |
| 2012/0029677 A1 | 2/2012 | Havener et al. |
| 2012/0072039 A1 | 3/2012 | Anderson et al. |
| 2012/0146799 A1 | 6/2012 | Bell et al. |
| 2012/0197558 A1 | 8/2012 | Henig et al. |
| 2012/0200423 A1 | 8/2012 | DiLuciano et al. |
| 2013/0080205 A1 | 3/2013 | Anderson et al. |
| 2013/0232094 A1 | 9/2013 | Anderson et al. |

OTHER PUBLICATIONS

International Search Report and Written Opinion for PCT/US2012/056321, dated Dec. 7, 2012.

Doukas, et al., "Intelligent Building Energy Management System Using Rule Sets", *Building and Environment*, 42:3562-3569 (2007) [online]. Retrieved Oct. 29, 2012 from URL:<http://www.aseanbiotechnology.info/Abstract/21024252.pdf>.

Ma, "Online Supervisory and Optimal Control of Complex Building Central Chilling Systems", [online], dated Apr. 2008. Retrieved on Oct. 29, 2012 from URL:<http://repository.lib.polyu.edu.hk/jspui/bitstream/10397/3415/2/b2239753x_ir.pdf>.

Martin, "Optimal Prediction, Alarm, and Control in Buildings Using thermal Sensation Complaints", [online] Fall 2004. Retrieved on Oct. 29, 2012 from URL:<http://ti.arc.nasa.gov/m/pub-archive/archive/PhDThesis.pdf>.

Trcka, "Co-Simulation for Performance Prediction of Innovative Intergated mechanical Energy Systems in Buildings", [online] Oct. 8, 2008. Retrieved on Oct. 29, 2012 from URL:<http://www.bwk.tue.nl/bps/hensen/team/past/Trcka.pdf>.

U.S. Appl. No. 13/274,770 (Abandoned), filed Oct. 17, 2011.
U.S. Appl. No. 12/885,750, filed Sep. 20, 2010.
U.S. Appl. No. 12/885,800, filed Sep. 20, 2010.
U.S. Appl. No. 13/274,770 (Abandoned), filed Jul. 23, 2008.
U.S. Appl. No. 13/479,198, filed May 23, 2012.
U.S. Appl. No. 13/589,916, filed Aug. 20, 2012.
U.S. Appl. No. 13/274,770, Jun. 8, 2012 Notice of Abandonment.
U.S. Appl. No. 12/019,347, Nov. 17, 2011 Advisory Action.
U.S. Appl. No. 12/019,347, Oct. 24, 2011 Amendment and Request for Continued Examination (RCE).
U.S. Appl. No. 12/019,347, Jul. 25, 2011 Final Office Action.
U.S. Appl. No. 12/019,347, Jun. 8, 2011 Response to Non-Final Office Action.
U.S. Appl. No. 11/349,711, Mar. 13, 2008 Issue Fee payment.
U.S. Appl. No. 11/349,711, Feb. 22, 2008 Notice of Allowance.

(56) References Cited

OTHER PUBLICATIONS

U.S. Appl. No. 11/349,711, Dec. 14, 2007 Response to Non-Final Office Action.
U.S. Appl. No. 11/349,711, Aug. 17, 2007 Non-Final Office Action.
U.S. Appl. No. 12/045,458, Sep. 6, 2011 Issue Fee payment.
U.S. Appl. No. 12/045,458, Jun. 3, 2011 Notice of Allowance.
U.S. Appl. No. 12/045,458, May 10, 2011 Response to Non-Final Office Action.
U.S. Appl. No. 12/045,458, Jan. 10, 2011 Non-Final Office Action.
U.S. Appl. No. 12/045,458, Oct. 28, 2010 Response to Non-Final Office Action.
U.S. Appl. No. 12/045,458, Apr. 30, 2010 Non-Final Office Action.
U.S. Appl. No. 12/178,553, Apr. 5, 2011 Issue Fee payment.
U.S. Appl. No. 12/178,553, Jan. 7, 2011 Notice of Allowance.
U.S. Appl. No. 12/178,553, Dec. 2, 2010 Response to Non-Final Office Action.
U.S. Appl. No. 12/178,553, Jun. 4, 2010 Non-Final Office Action.
U.S. Appl. No. 12/885,800, Nov. 6, 2012 Response to Non-Final Office Action.
U.S. Appl. No. 12/885,800, Jul. 9, 2012 Non-Final Office Action.
Shervais, "Adaptive Critic Based Adaptation of a Fuzzy Policy Manager for a Logistic System", *IEEE*, 0-7803-7078, pp. 568-573 (2001).
Begg et al., "The Value of Flexibility in Managing Uncertainty in Oil and Gas Investments", *SPE 77586*, pp. 1-10 (2002).
Saputelli et al., "Real-time Reservoir Management: A multiscale adaptive optimization and control approach", [Online] Downloaded Nov. 29, 2010. *Computational Geosciences Springer 2006*, http://www.springerlink.com/content/4175n8841743684v/fulltext.pdf; vol. 10: 61-96.
Long et al., "Martingale Boosting", *COLT 2005, LNAI 3559*, pp. 79-94 (Jun. 2005).
Auer et al., Learning Theory, 18th Annual Conference on Learning Theory, COLT 2005, Bertinoro, Italy, Jun. 27-30, 2005, Proceedings. *Lecture Notes in Computer Science*, 3559.
Kong et al., "Web-based monitoring of real-time ECG data", *Computers in Cardiology*, 27: 189-192 (2000).
Hanley, et al., "The meaning and use of the area under a receiver operating characteristic (ROC) curve", *Radiology*, 143: 29-36 (Apr. 1982).
Zdrallek, "Reliability centered maintenance strategy for high voltage networks", *8th International Conference on Probabilistic Methods Applied to Power Systems*, pp. 332-337 (Sep. 2004).
Gross, et al., "Predicting electricity distribution feeder failures using machine learning susceptibility analysis", *AAAI, Proceedings of the 18th Conference on Innovative Applications of Artificial Intelligence*, pp. 1705-1711 (2006).
Warwick, et al., Shortened version of chapter 6 of the book "Artificial intelligence techniques in power systems", *IEE Power Engineering Series 22*, pp. 109-122 (1997).
Venayagamoorthy et al., "Experimental studies with continually online trained artificial neural networks identifiers for multiple turbo generators on the electric power grid", 2001, *IEEE*, 0-7803-7044, pp. 1267-1272.
Rajan, "Demand Side Management Using Expert Systems: 2003, TENCON 2003,Conference on Convergent Technologies for Asia-Pacific Region" *IEEE*, 0-7803-7651. (2003).
Rudin et al., "Predicting Vulnerability to Serious Manhole Events in Manhattan: A Preliminary Machine Learning Approach", Submitted for Journal, Dec. 2008, Retrieved online on Nov. 29, 2011 at : <http://www1.ccls.columbia.edu—rudin/RudinEtAI2008_ManholeEvents.pdf>, Entire Document.
Barry et al., "Applications of Learning Classifier Systems, Data Mining using Learning Classifier Systems", Springer, May 27, 2004, pp. 15-67, Retrieved online Nov. 29, 2011 at : <http://books.google.com/books?id=aBljqGag5kC&lr=&source=gbs_navlinks_s>.
Bickel, et al., "Semiparametric Inference and Model", Sep. 5, 2005 [retrieved on Jul. 23, 2012] Retrieved from the internet: URL:http://www.stat.washington.edu/jaw/JAW-papers/NR/jaw-BKR-EncylSS.pdf entire document.
Liu, et al., "Weighted Nonparametric Maximum Likelihood Estimate of a Mixing Distribution in Nonrandomized Clinical Trials", Feb. 20, 2006 [retrieved on Jul. 23, 2012] Retrieved from Internet: URL:HTTP://www.stat.purdue.edu/~junxie/Papers/weightedSBR.pdf> entire document.
Cameron, "Microeconometrics: Methods and Applications", *Cambridge University Press*, p. 333 (2005).
Bhatt, "The Application of Power Quality Monitoring Data for Reliability Centered Maintenance" EPRI (Electric Power Research Institute, Inc.) 152 pages (2000).
International Search Report for PCT/US2004/28185, dated Feb. 11, 2005.
International Search Report for PCT/US2010/024955, dated Apr. 23, 2010.
International Search Report for PCT/US2010/036717, dated Jul. 28, 2010.
International Search Report and Written Opinion for PCT/US2009/037996, dated May 19, 2009.
International Search Report and Written Opinion for PCT/US2009/037995, dated Mar. 23, 2009.
International Search Report and Written Opinion for PCT/US2011/044389, dated Dec. 14, 2011.
International Search Report and Written Opinion for PCT/US2012/050439, dated Oct. 22, 2012.
International Search Report and Written Opinion for PCT/US2012/033309, dated Aug. 1, 2012.
Amoedo, "A Structured Methodology for Identifying Performance Metrics and Monitoring Maintenance Effectiveness", *M.S. Dissertation, University of Maryland*, College Park, United States, (2005).
Barabady, et al. "Availability Allocation Through Importance Measures", *The International Journal of Quality & Reliability Management*, 24(6):643-657 (2007).
Chen, "Distributed Multi-Modal Human Activity Analysis: From Algorithms to Systems", *Ph.D. dissertation, Princeton University*, United States, New Jersey, (Retrieved Mar. 25, 2012).
Hobbs, "Optimization Methods for Electric Utility Resource Planning", *European Journal of Operational Research*, pp. 1-20 (May 18, 1995).
Keeney, et al., "Evaluating Improvements in electricity Utility Reliability at British Columbia Hydro", *Operations Research*, 43(6):933-947 (Nov./Dec. 1995).
Naidu, et al., "An Empirical Model for Maintenance Strategy Selection Based on Organization Profit", *Proceedings of the 2009 Industrial Engineering Research Conference*, pp. 1765-1770 (Jan. 2009).
Chambal, "Advancing Reliability, Maintability, and Availability Analysis Through a Robust Simulation Environment", *Ph.D. Dissertation, Arizona State University*, United States (1999).
Chen, "Performance and Control of Parallel Multi-Server Queues with Applications to Web Hosting Services", *Ph.D. Dissertation, The Pennsylvania state University*, United States (2006).
U.S. Appl. No. 13/646,939, filed Oct. 8, 2012.
U.S. Appl. No. 12/777,803, Apr. 1, 2013 Non-Final Office Action.
U.S. Appl. No. 12/909,022, Mar. 14, 2013 Non-Final Office Action.
U.S. Appl. No. 13/646,939, Apr. 2, 2013 Non-Final Office Action.
U.S. Appl. No. 13/742,124, filed Jan. 15, 2013.
U.S. Appl. No. 12/909,022, Aug. 15, 2013 Final Office Action.
U.S. Appl. No. 12/909,022, Aug. 6, 2013 Response to Non-Final Office Action.
U.S. Appl. No. 12/019,347, Sep. 11, 2013 Issue Fee payment.
U.S. Appl. No. 13/742,124, Sep. 20, 2013 Non-Final Office Action.
U.S. Appl. No. 13/646,939, Aug. 2, 2013 Response to Non-Final Office Action.
U.S. Appl. No. 13/646,939, Sep. 6, 2013 Final Office Action.
U.S. Appl. No. 12/885,800, Jul. 18, 2013 Amendement and Request for Continued Examination (RCE).
Becker, et al., "Real-time Ranking with Concept Drift Using Expert Advice", *Proceedings of the 13th ACM SIGKDD International Conference on Knowledge Discovery and Data Mining*,ACM, pp. 86-94 (2007).
Dutta, et al., "Estimating the Time Between Failures of Electrical Feeders in the New York Power Grid", *Next Generation Data Mining Summit*, NGDM, 5 pages (2009).

(56) References Cited

OTHER PUBLICATIONS

Gross, et al., "Ranking Electrical Feeders of the New York Power Grid", *2009 International Conference on Machine Learning and Application*, pp. 1-7 (2009).

Gross, et al., "Predicting Electricity Distribution Feeder Failures Using Machine Learning Susceptibility Analysis", *Proceedings of the National Conference on Artificial Intelligence*, 21(2):1-7 (2005).

Radeva, et al., "Report Cards for Manholes: Eliciting Expert Feedback for a Learning Task", *2009 International Conference on Machine Learning and Applications*, pp. 1-6 (2009).

Rudin et al. "Predicting vulnerability to serious manhole events in Manhattan: A preliminary machine learning approach", *Machine Learning Manuscript* No. 80.1; pp. 1-31 (Jan. 28, 2010).

Rudin, et al., "A process for predicting manhole events in Manhattan", *IEEE Transactions on Pattern Analysis and Machine Intelligence*, 80(1):1-21 (Jul. 2010).

Rudin, et al., "A process for predicting manhole events in Manhattan", *Machine Learning*, 80(1):1-31 (Jan. 28, 2010).

U.S. Appl. No. 14/137,381, filed Dec. 20, 2013.
U.S. Appl. No. 13/214,057, Jan. 2, 2014 Non-Final Office Action.
U.S. Appl. No. 13/742,124, Dec. 27, 2013 Interview Summary.
U.S. Appl. No. 13/742,124, Dec. 20, 2013 Response to Non-Final Office Action.
U.S. Appl. No. 13/646,939, Jan. 7, 2014 Notice of Allowance.

Chen, et al., "Particle Swarm Optimization for Next Generation Smart Grid Outage Analyses", *IEEE Transmission and Distribution Conference and Exposition*, pp. 1-6 (2012).

Choi, et al., "The Design of Outage Management System Utilizing Meter Information Based on AMI (Advanced Metering Infrastructure) system", *IEEE, 8th International Conference on Power Electronics—ECCE Asia*, pp. 2955-2961 (May 30-Jun. 30, 2011).

Russell, et al., "Intelligent Systems for Improved Reliability and Failure Diagnosis in Distribution Systems", *IEEE Transactions on Smart Grid*, 1(1):48-56 (2010).

Zhu, et al., "Lassoing Line Outages on the Smart Power Grid", *IEEE International Conference of Smart Grid Communications*, pp. 570-575 (2011).

\* cited by examiner

METRICS MONITORING AND FINANCIAL VALIDATION SYSTEM (M2FVS) FOR TRACKING PERFORMANCE OF CAPITAL, OPERATIONS, AND MAINTENANCE INVESTMENTS TO AN INFRASTRUCTURE

CROSS-REFERENCE TO RELATED APPLICATIONS

This application is a continuation of International Patent Application Serial No. PCT/US2011/026056 filed Feb. 24, 2011 and claims priority to U.S. Provisional Application Ser. No. 61/307,792 filed on Feb. 24, 2010, the contents of both of which are hereby incorporated by reference in their entireties herein.

COPYRIGHT NOTICE

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

FIELD

The disclosed subject matter relates to methods and systems for monitoring the realized effectiveness of a capital improvement to an infrastructure (e.g., a capital improvement project) and for evaluating the effectiveness of models that predict the benefits that would be obtained upon performing a proposed capital improvement project.

BACKGROUND

Infrastructures, particularly mature infrastructures, are in constant need of improvement and upgrade. Such projects are often funded at least in part by public monies and grants. There is a need for an empirical, "non-emotional" method of determining the realized effectiveness of capital improvement projects.

Models have been disclosed that predict the effectiveness of capital improvement projects. For example, International Publication Nos. WO 2009/117742 and WO 2010/138906, each of which are hereby incorporated by reference, disclose methods and systems useful for predicting the effectiveness of capital improvement projects. There remains a need, however, to evaluate the accuracy of such predictive models after the work has been performed, and if necessary, implement changes to these predictive models so that future predictions are more accurate.

SUMMARY

One aspect of the presently disclosed subject matter provides a method of evaluating the accuracy of a predicted effectiveness of an improvement to an infrastructure that includes (a) determining the realized effectiveness of an improvement to an infrastructure, (b) determining the predicted effectiveness of the improvement to the infrastructure; (c) comparing the realized effectiveness of the improvement to the infrastructure to the predicted effectiveness of the improvement to the infrastructure; wherein said comparing is based, at least in part, on at least one pre-defined metric, and the comparing occurs in an automatic and/or continuous basis.

Another aspect of the presently disclosed subject matter provides a system for evaluating the accuracy of a predicted effectiveness of an improvement to an infrastructure based on data collected from the infrastructure during a first time period before a change to an infrastructure has been implemented and a second time period after the change to the infrastructure has been implemented, the collected data including information representative of at least one pre-defined metric of the infrastructure, that includes (a) a data collector for collecting data from an infrastructure during a first time period before a change to an infrastructure has been implemented and a second time period after the change to the infrastructure has been implemented, the data including information representative of at least one pre-defined metric of the infrastructure, a complier, adapted to receive and compile the collected data to generate compiled data representative of the first time period and compiled data representative of the second time period, (c) a machine learning system, coupled to the compiler and adapted to receive the compiled data representative of the first time period therefrom and generate corresponding machine learning data, a machine learning results evaluator, coupled to the machine learning system, to empirically analyze the generated machine learning data, an implementer to implement the change to the infrastructure, wherein the change to the infrastructure is based at least in part on the data from the machine learning data outputer, and a system performance improvement evaluator, coupled to the complier and adapted for receiving the compiled data representative of the first time period and the compiled data representative of the second time period therefrom, and coupled to the machine learning system and adapted for receiving the generated machine learning data therefrom, for: (i) comparing the compiled data representative of the first time period to the compiled data representative of the second time period to determine a difference, if any, and (ii) comparing the difference, if any, determined in (i) to a prediction based on the generated machine learning data.

Another aspect of the presently disclosed subject matter provides a method for evaluating the accuracy of a predicted effectiveness of an improvement to an infrastructure based on data collected from the infrastructure during a first time period before a change to an infrastructure has been implemented and a second time period after the change to the infrastructure has been implemented, the collected data including information representative of at least one pre-defined metric of the infrastructure, that includes: (a) collecting data from an infrastructure during a first time period before a change to an infrastructure has been implemented and a second time period after the change to the infrastructure has been implemented, the data including information representative of at least one pre-defined metric of the infrastructure; (b) compiling the collected data to generate compiled data representative of the first time period and compiled data representative of the second time period; (c) performing machine learning on the compiled data representative of the first time period and generating corresponding machine learning data; (d) storing and empirically evaluating the generated machine learning data; (e) implementing the change to the infrastructure, wherein the change to the infrastructure is based at least in part on the generated machine learning data, and (f) comparing the compiled data representative of the first time period to the compiled data representative of the second time period to determine a difference, if any, and (ii) comparing the difference, if any, determined in (i) to a prediction based on the generated machine learning data.

BRIEF DESCRIPTION OF THE DRAWINGS

Further objects, features and advantages of the disclosed subject matter will become apparent from the following detailed description taken in conjunction with the accompanying figures showing illustrative embodiments of the disclosed subject matter, in which.

DETAILED DESCRIPTION

Figure 1:
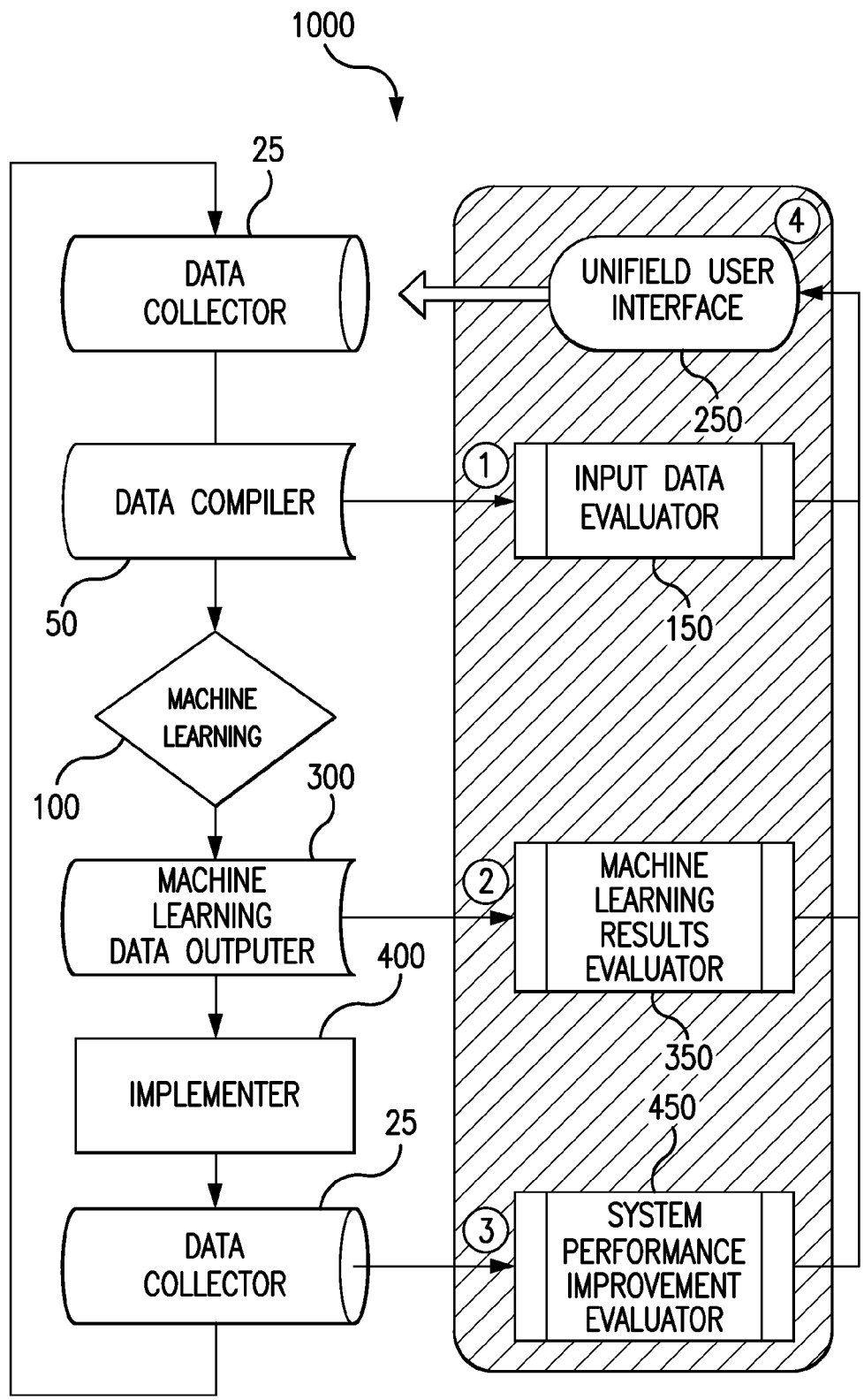
FIG. 1 depicts an overview of system architecture for a representative system of the presently disclosed subject matter according to one non-liming embodiment of the present application.

In one aspect of the presently disclosed subject matter, the performance of a machine learning system in connection with an infrastructure (e.g., an electrical grid) is evaluated in an objective manner. The realized effectiveness of an improvement to an infrastructure can be compared to a predicted effectiveness of an improvement to an infrastructure. The improvement to the infrastructure can be chosen based on the predicted effectiveness of that infrastructure improvement. Further, the system can contain safeguards to ensure a proper prediction. For example, the quality of the data input and output and the consequential benefits after the actions recommended by a machine learning system can be evaluated in real-time.

One aspect of the presently disclosed subject matter provides a method of evaluating the accuracy of a predicted effectiveness of an improvement to an infrastructure that includes (a) determining the realized effectiveness of an improvement to an infrastructure, (b) determining the predicted effectiveness of the improvement to the infrastructure; (c) comparing the realized effectiveness of the improvement to the infrastructure to the predicted effectiveness of the improvement to the infrastructure; wherein said comparing is based, at least in part, on at least one pre-defined metric, and the comparing occurs in an automatic and/or continuous basis.

In one particular embodiment, the infrastructure is an electrical grid, and the predicted effectiveness of the improvement to the infrastructure is obtained based at least in part from machine learning. In one embodiment, the machine learning receives only data that meets the at least one predetermined threshold requirement representative of data quality.

Another aspect of the presently disclosed subject matter provides a system for evaluating the accuracy of a predicted effectiveness of an improvement to an infrastructure (e.g., an electrical grid) based on data collected from the infrastructure during a first time period before a change to an infrastructure has been implemented and a second time period after the change to the infrastructure has been implemented, the collected data including information representative of at least one pre-defined metric of the infrastructure, that includes (a) a data collector for collecting data from an infrastructure during a first time period before a change to an infrastructure has been implemented and a second time period after the change to the infrastructure has been implemented, the data including information representative of at least one pre-defined metric of the infrastructure, a complier, adapted to receive and compile the collected data to generate compiled data representative of the first time period and compiled data representative of the second time period, (c) a machine learning system, coupled to the compiler and adapted to receive the compiled data representative of the first time period therefrom and generate corresponding machine learning data, a machine learning results evaluator, coupled to the machine learning system, to empirically analyze the generated machine learning data, an implementer to implement the change to the infrastructure, wherein the change to the infrastructure is based at least in part on the data from the machine learning data outputer, and a system performance improvement evaluator, coupled to the complier and adapted for receiving the compiled data representative of the first time period and the compiled data representative of the second time period therefrom, and coupled to the machine learning system and adapted for receiving the generated machine learning data therefrom, for: (i) comparing the compiled data representative of the first time period to the compiled data representative of the second time period to determine a difference, if any, and (ii) comparing the difference, if any, determined in (i) to a prediction based on the generated machine learning data.

In one embodiment, the system includes a unified user interface in communication with at least one of the machine learning results evaluator and the system performance evaluator. The system can further include an input data evaluator, in communication with the data compiler, to determine if the compiled collected data meets at least one predetermined threshold requirement representative of data quality. The input data evaluator can also be in communication with the unified user interface and can send to the unified user interface, for example, a sparkline graph.

In one embodiment, the machine learning system receives only data that meets the at least one predetermined threshold requirement representative of data quality. In one embodiment, the machine learning results evaluator sends to the unified user interface at least one of a ROC Curve, or an Area under a ROC curve. In one embodiment, the machine learning data outputer outputs a list of electrical feeders ranked according to their susceptibility to failure.

Another aspect of the presently disclosed subject matter provides a method for evaluating the accuracy of a predicted effectiveness of an improvement to an infrastructure based on data collected from the infrastructure during a first time period before a change to an infrastructure has been implemented and a second time period after the change to the infrastructure has been implemented, the collected data including information representative of at least one pre-defined metric of the infrastructure, that includes; (a) collecting data from an infrastructure during a first time period before a change to an infrastructure has been implemented and a second time period after the change to the infrastructure has been implemented, the data including information representative of at least one pre-defined metric of the infrastructure; (b) compiling the collected data to generate compiled data representative of the first time period and compiled data representative of the second time period; (c) performing machine learning on the compiled data representative of the first time period and generating corresponding machine learning data; (d) storing and empirically evaluating the generated machine learning data; (e) implementing the change to the infrastructure, wherein the change to the infrastructure is based at least in part on the generated machine learning data, and (f) comparing the compiled data representative of the first time period to the compiled data representative of the second time period to determine a difference, if any, and (ii) comparing the difference, if any, determined in (i) to a prediction based on the generated machine learning data.

In one embodiment, the method further includes communicating output from at least one of the machine learning results evaluator and the system performance evaluator to a unified user interface. The method can further include evaluating input data to determine if the compiled collected data meets at least one predetermined threshold requirement representative of data quality. Evaluated input data can be communicated to the unified user interface. The generated machine learning can include, for example, a list of electrical feeders ranked according to their susceptibility to failure.

The machine learning system that is evaluated can be a complex online system that processes a large (and growing) number of live data feeds and generates output rankings continuously in real-time. The input data can also be complex, and this data can be checked for abnormities on the fly. It is noted that it the evaluation should be objective, and it can be difficult to conduct unbiased measurements, as there are no definitive criteria to immediately determine whether the ranking results are good or bad. Machine learning researchers and power engineers could interpret the same result set from completely different perspectives.

Additionally, the evaluation does not necessarily stop once the machine learning system outputs ranking results. In certain embodiments, the evaluation continues to measure the subsequent improvements to the infrastructure (e.g. electrical grid improvements), or lack thereof, following the machine learning output, and also provide quantitative results on cost and benefit for repair work.

The presently disclosed subject matter provides an evaluation framework that is able to objectively, effectively, and efficiently evaluate this kind of real-time online machine learning applied in a complex mission-critical cyber-physical system, i.e., a system featuring a tight combination of, and coordination between, the system's computational and physical elements. The framework provides a comprehensive multi-stage online evaluation of the machine learning not only on its results, but also on input data quality and physical system improvements. An integrated framework for evaluating the online machine learning systems used for an infrastructure (e.g., a smart grid); real-world implementation, deployment, and performance analysis of such an approach; providing a general methodology for evaluating similar machine learning systems applied in infrastructures for other fields is provided.

Merely for purposes of illustration, and not limitation, the presently disclosed subject matter will be described in connection with a power grid. The power grid is the electricity distribution and transmission system that connects electricity generators and consumers. It is a power and information network that includes of power plants, transformers, high-voltage long-distance power transmission lines, substations, feeders, low-voltage local power lines, meters, and consumer appliances.

One of the main causes of the power grid failure is electrical component failure. These component failures may lead to cascading failures. To ensure the power grid is running smoothly, preventive maintenance is performed and feeders can be evaluated based on susceptibility of failure. The electrical components that are most susceptible to failure can be proactively taken offline for maintenance or replacement. Feeders are widely used transmission lines with radial circuit of intermediate voltage. For example, in New York City, underground primary feeders are one of the most failure-prone electrical components. To predict feeder failures, we developed several machine learning systems to rank the feeders according to their susceptibility to failure. See, e.g., U.S. Published Application No. 2009/0157573, which is hereby incorporated by reference in its entirety.

MartaRank and ODDS (Outage Derived Data Sets) are two machine learning-based feeder ranking systems. MartaRank was an earlier system employing Support Vector Machines (SVM), RankBoost, Martingale Boosting and an ensemble-based wrapper, along with some customizations. See, e.g., Gross, P. et al., Predicting electricity distribution feeder failures using machine learning susceptibility analysis, In Proceedings of the Eighteenth Conference on Innovative Applications of Artificial Intelligence IAAI (2006); Becker, H. et al., Real-time ranking with concept drift using expert advice, In Proceedings of the 13th ACM SIGKDD International Conference on Knowledge Discovery and Data Mining (KDD), 86-94. New York, N.Y., USA: ACM; Long, P. M., and Servedio, R. A. 2007. Boosting the area under the roc curve, In Neural Information Processing Systems—NIPS. The ODDS ranking system uses ranking and scores from linear SVM (Gross et al. 2009). Gross, P. et al., Ranking electrical feeders of the New York power grid, In Proceedings of the International Conference on Machine Learning and Applications (ICMLA), 725-730 (2009). Each of these references are hereby incorporated by reference in their entirety.

The presently disclosed subject matter provides systems and methods to monitor the realized effectiveness of an improvement to an infrastructure (e.g., a capital improvement project). In one embodiment, monitoring the realized effectiveness of an improvement to an infrastructure includes comparing the realized effectiveness of the improvement to the infrastructure to the predicted effectiveness of the improvement to the infrastructure, based on at least one pre-defined metric, in which the comparing occurs in an automatic and/or continuous basis. Due to the automatic and/or continuous nature of the comparison, the realized effectiveness of the improvement to the infrastructure can be ascertained in an impartial mariner.

The predicted effectiveness of the improvement to the infrastructure can be determined based on at least one prediction model (e.g., a susceptibility to failure model that includes at least one algorithm). In one embodiment, the difference between a) the realized effectiveness of an improvement to an infrastructure, and b) the predicted effectiveness of the improvement to the infrastructure, based on at least one pre-defined metric, is inputted to the prediction model to improve, via machine learning, the ability of the prediction model to predict the effectiveness of a second improvement to an infrastructure.

In an alternative embodiment, the presently disclosed subject matter provides a multi-stage real-time online evaluation framework that can, for example, evaluate the performance of MartaRank and ODDS feeder ranking systems, quality of the input data and output results, and the consequential power system improvements after the worst ranked feeders have been fixed. The system (1000) design and workflow according to one non-limiting embodiment of the disclosed subject matter is illustrated in FIG. 1.

Various methods can be used to predict the effectiveness of an improvement to an infrastructure. For example, the methods disclosed in International Published Application No. WO 2009/117742, hereby incorporated by reference in its entirety, can be used to predict the effectiveness of an improvement to an infrastructure, and thus can be used in conjunction with the presently disclosed subject matter.

As shown in FIG. 1, the rhombus-shaped machine learning process (100) is treated as a "black-box," providing a system that is neutral (i.e., unbiased) towards the particular machine-learning process employed. The system (1000) does not analyze, or otherwise study the internal workings of the machine learning algorithm, including specifications, requirements, and design to derive evaluation cases. Only the data input and the machine learning results are evaluated.

In this embodiment, the system (1000) is an online evaluation approach that runs continuously as long as the machine learning system is running. This differs from many statically analyzed machine learning systems that often employ a post-mortem evaluation and analysis. The design decouples the evaluation process from the machine learning process and ensures the efficient real-time processing.

Visual techniques can be incorporated, such as, for example, the systems and methods disclosed in International Published Application No. 2010/138906, which is hereby incorporated by reference. The visualization components can assist engineers and researchers to locate trends and abnormalities that would otherwise unnoticed, as it would be buried in the data.

In this embodiment, an automatic approach is employed. In preferred embodiments, minimal downtime is required, and the system can self-manage an self-alert the system when abnormal events happen. When any required data feeds stop updating or the ranking results deteriorate significantly, the system can flag the events and generate alert notifications (e.g., alert emails or warning messages).

As illustrated in FIG. 1, the system can conduct an automated and integrated evaluation at multiple stages along the work-flow of the system. In one embodiment, systems of the presently disclosed subject matter include an input data evaluator, a machine learning output evaluator, and a system performance improvement evaluator. All or part of the evaluator results can be directed to a unified user interface. Each of these system components will be described below, along with the description of the accompanying methods of employing the system, which will be understood from description of the system.

Input Data Evaluator

In certain embodiments, input data sets are collected from an infrastructure (e.g., data is collected from a power grid by a data collector (25) and compiled in a data compiler (50). The data compiler is in communication with the input data evaluator (150), where the data can, for example, be compared against a pre-defined quality specifications. The input data evaluator can notify the system when the input data from the data compiler does not meet the pre-defined quality specifications and take appropriate action. For example, when the input data evaluator determines that input data from the data compiler does not meet pre-defined quality specifications, the system can discard later processing of the input data, or alternatively, the system, upon notification from the input data evaluator, can quarantine system output that is based on the processing steps downstream from the input data evaluator after receiving a quarantine notification.

The input data evaluator can use data constraints and checks to determine if the minimum threshold data quality being introduced the input data evaluator, and whether the input data is up-to-date (e.g., current based on pre-defined metrics). In certain non-limiting embodiments, the input data evaluator can include fine-grained techniques, such as outputting the results of the input data evaluator (via, for example, the unified user interface, 250) in the form of sparkline graph, in which information is displayed graphically in small size and high data density. See, e.g., Tufte, E. 2006, *Beautiful Evidence*, Graphics Press, which is hereby incorporated by reference in its entirety. In such embodiments, the input data evaluator correlates the changes to input data sets with variations of machine learning results (described below), and displays and/or records the results to the unified user interface, so that further study can be done to improve machine learning accuracy.

For example, in feeder ranking systems, sparkline graphs can be employed by the input data evaluator to evaluate input data, such as, for example, the real-time data for hundreds of static and dynamic attributes like maximum scaled voltage, number of joints, number of cables, peak load, and the like for each feeder (hereby referred to as feeder attribute data). After the feeder attribute data have been collected (e.g. collected from heterogenous sources) it can be compared to with other related non-feeder data such as temperature and network load information and aggregated into data sets. As shown in FIG. 1, results (200) (including the aggregated data sets discussed above) can be passed on to the machine learning system (100) and further processed as discussed below.

Figure 2:
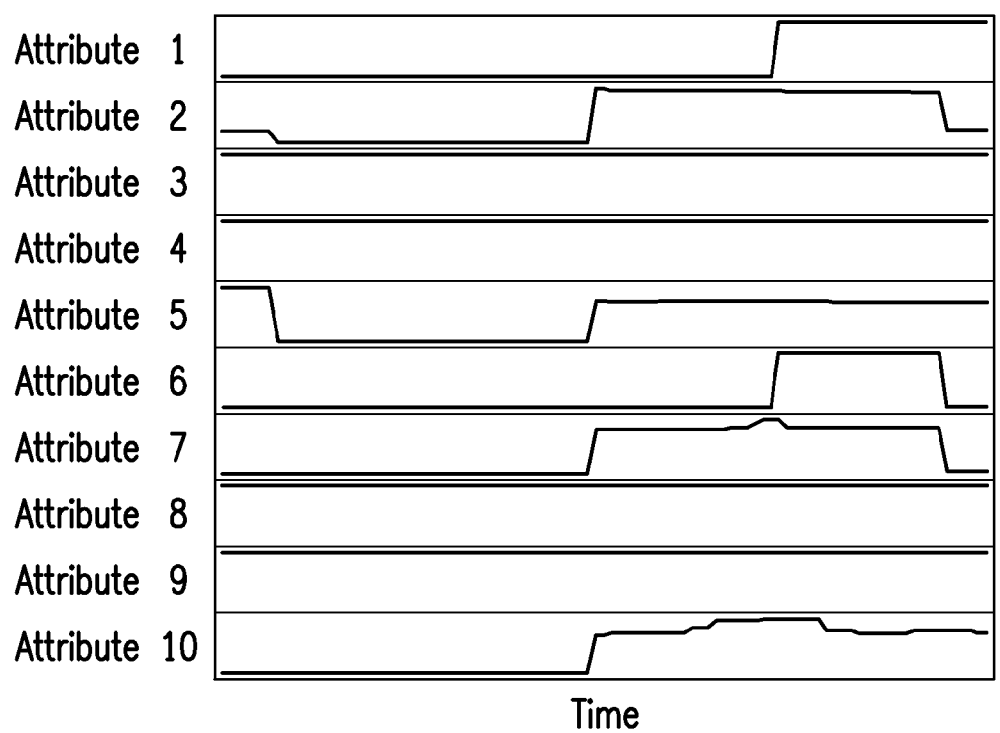
FIG. 2 depicts a sparkline time series graph of ten feeder attributes for a one-day period preceding an adverse event, which in this non-limiting embodiment is a failure of an electrical grid.

As shown in FIG. 2, for a one-day period preceding an actual outage of an electrical grid, among the five attribute feeders plotted, attribute 5 showed a notable drop and subsequent climb in a sparkline time series graph. Information from this graph can be used for further analysis, especially in future selection.

Attributes that can plotted in, for example a sparkline time series graph include LoadPocketWeight (LPW), Outages (OA), RMS (an electronic voltage measurement), System Electric Load, Static Feeder Load, and Transformer Load Variance, etc In one embodiment, attributes inputted into the input data evaluator include one or more, three or more of, five of more of, or comprising all of, or consist of, 1) LPW_SUM_Avg_last__07_days, LPW_SUM_Max_last__07_days, LPW_SUM_Min_last__45_days, OUT_CIOA_allprev_season, OUT_Other_allprev_season, OUT_Other_prev_season, RMSV_Current_Cnt_last__07_days, RMSV_Event_Cnt_last__07_days, RMSV_ Log_Avg_Abs_Duration_last__24_hrs, RMSV_Log_Sum_ Abs_Duration_full_history, RMSV_Log_Sum_Abs_Duration_last__

07_days, RMSV_Log_Sum_Pos_Area_last_07_days, RMSV_Log_Sum_Pos_Area_last_24_hrs, RMSV_Max_Scaled_Voltage_last_07_days, RMSV_Max_Scaled_Voltage_last_24_hrs, RMSV_Min_Scaled_Voltage_last_07_days, RMSV_Min_Scaled_Voltage_last_24_hrs, RMSV_Sum_Pos_Area_full_history, RMSV_Sum_Pos_Area_last_07_days, RMSV_Sum_Pos_Area_last_24_hrs, SYS_Electric_Load_Forecast, SYS_Temperature_Variable, Static_Emergency_Proj_Load, Static_Feeder_Load, Static_Non_West_Transformer_10_19.

Machine Learning Result Evaluator

As mentioned above, and with reference back to FIG. 1, results from a data compiler (50), depending on the analysis of the input data evaluator (150), can be allowed to be sent to a machine learning system (100). Machine learning systems to evaluate proposed changes to an infrastructure have been previously described and are known in the art. For example, and as described in greater detail in U.S. Published Application No. 2009/0157573, which is hereby incorporated by reference, the machine learning system can rank components of an infrastructure based on their predicted susceptibility to impending failure. In one particular embodiment, the machine learning system ranks electrical feeders in an electrical grid based on their predicted likelihood of failure.

Results from the machine learning system are output to a machine learning data outputer (300), which outputs the data to a machine learning result evaluator (350). The machine learning evaluator evaluates the machine learning's performance quantitatively or empirically using metrics and/or blind tests. For example ROC Curves, or Area under ROC curves can be employed.

In one particular embodiment, the machine learning evaluator evaluates a ranked list of infrastructure components that are ordered by the machine learning system by potential vulnerability. In certain embodiments, Receiver Operator Characteristic (ROC) curves can be used, as well as accompanying rank statistics such as the Area Under the Curve (AUC).

As would be understood by one or ordinary skill in the art, the AUC is equal to the probability that a classifier will rank a randomly chosen positive instance higher than a randomly chosen negative one. See, e.g., Bradley, A. P. 1997, The Use of the Area Under the ROC Curve in the Evaluation of Machine Learning Algorithms, Pattern Recognition 30(7):1145-1159, and Fawcett, T. 2006. An Introduction to ROC Analysis, Pattern, each of which are hereby incorporated by reference. It is in the range of [0,1], where an AUC of 0.5 represents a random ordering, and an AUC of close to 1.0 represents better ranking with the positive examples at the top and the negative ones at the bottom.

Figure 3:
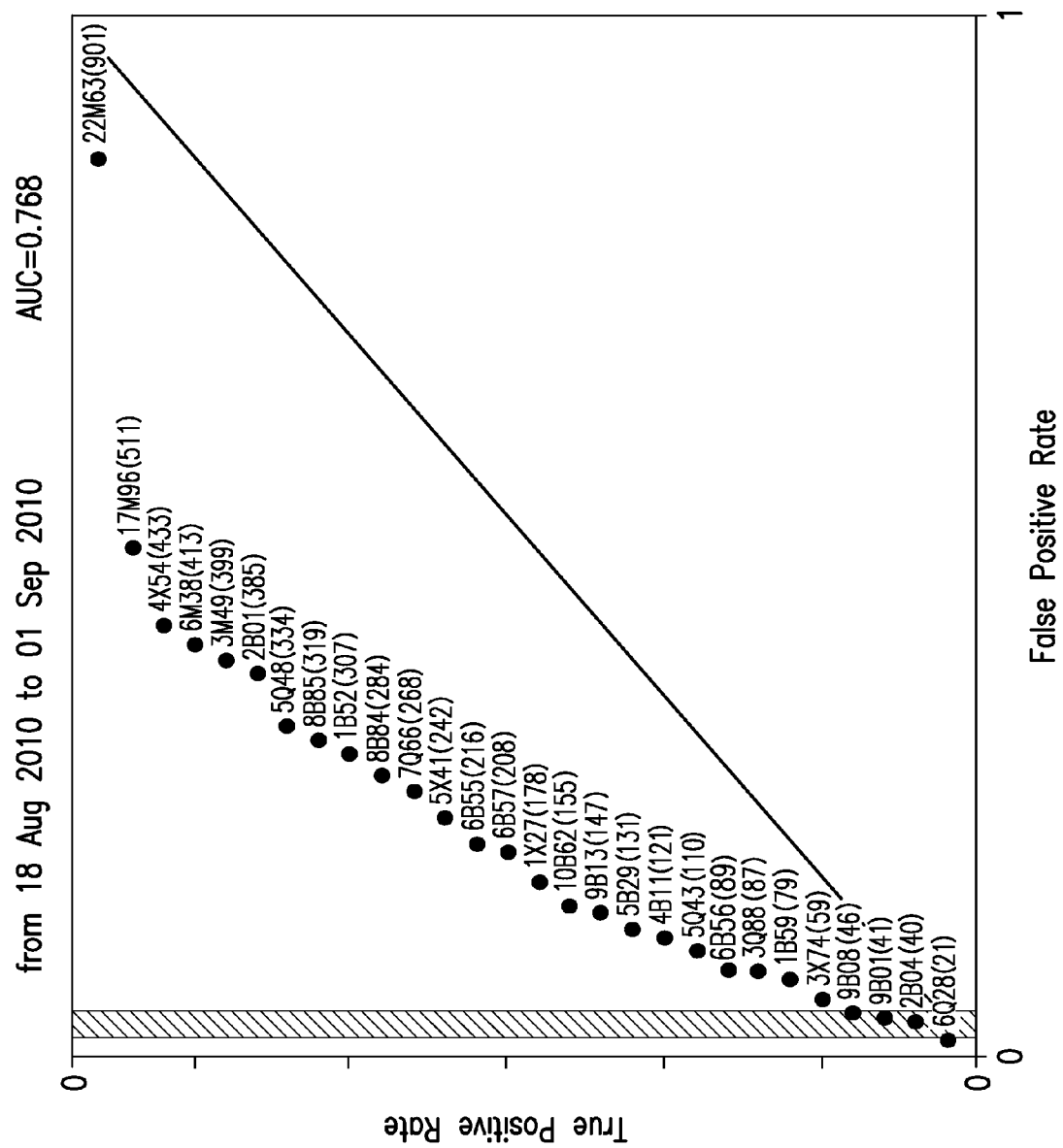
FIG. 3 depicts a ROC curve provided by the machine learning results evaluator to evaluate machine learning results that provide list of electrical feeders ranked according to their susceptibility to failure.

FIG. 3 illustrates one typical ROC curve for a feeder ranking. The description for each data point (e.g., 17M96 (511), where 17M96 is the feeder designation and 511 stands for the feeders ranked susceptibility to failure.

Figure 4:
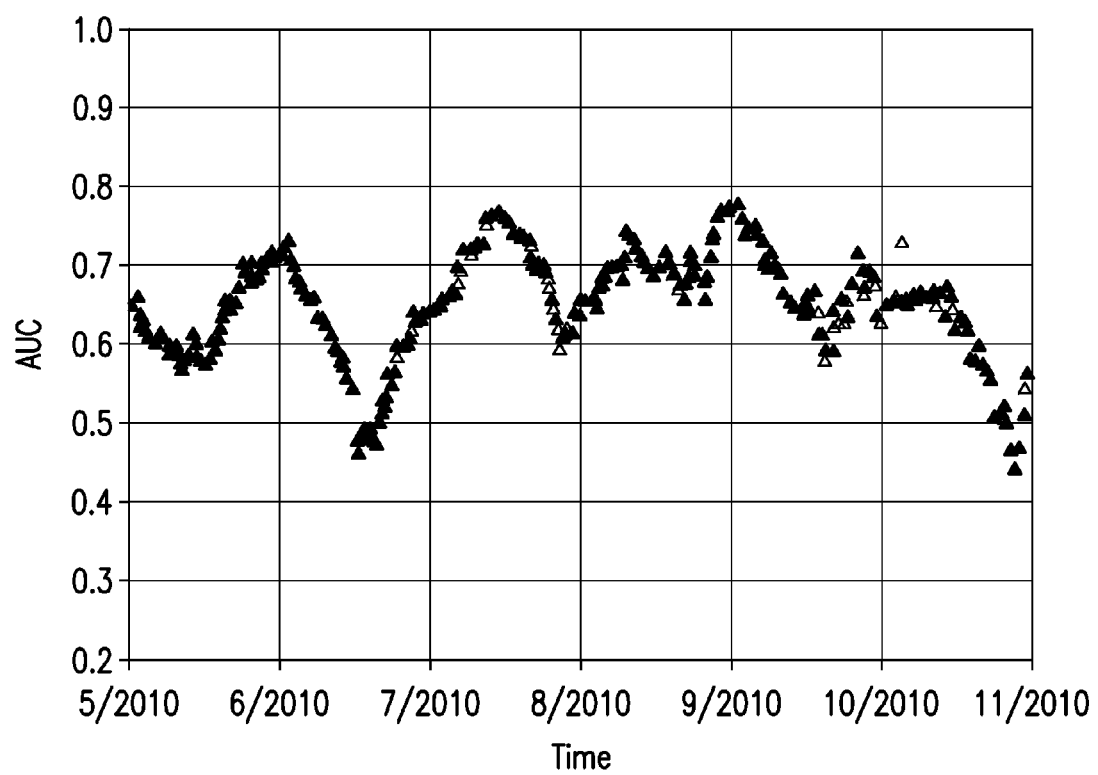
FIG. 4 depicts an AUC time series graph provided by the machine learning results evaluator to evaluate machine learning results on the fly.

Since the presently disclosed system is used to evaluate real-time online ranking systems, a continuous real-time AUC is desirable for researchers and grid operators to evaluate the machine learning performance on the fly. For this reason, an AUC time series graph, as illustrated in FIG. 4, is employed. A graph of this sort also allows one to estimate the average AUC performance for a given time period. For example, in one particular embodiment, for a specific time period (e.g., a 3 month period), the AUC time series can be aggregated via, for example, linear regression or mean average to get the average AUC number, which can be used as an indicator of the accuracy of the machine learning prediction for the given time period.

System Performance Improvement Evaluator

With reference to FIG. 1, the machine learning system outputs ranking results to a machine learning data outputer (300). Based on the outputted results, an implementer (400) implements actions on the infrastructure. For example, in the context of an electrical grid, the feeders ranked with highest susceptibility to failure are usually treated with a higher priority, and actions can be taken with respect to those feeders (e.g., feeders can be taken off line). The implementer can take the feeder with the highest priority off line. For example, the implementer can take the feeder with the highest priority offline for proactive maintenance; schedule the ongoing maintenance, including replacement, for the feeders in a region; or divert the network load to the nearby feeders or power network in order to reduce the failure possibility.

After the implementer has implemented actions on the infrastructure, data is collected from the operation of the infrastructure by the data collector (25). A later stage of the system is to validate that the recommended actions are in fact leading to the expected power system improvement, i.e., fewer outages and longer time between failures. This validation occurs within the system performance improvement evaluator (450), which is in communication with the data collector.

As shown in FIG. 1, the system performance improvement evaluator is also in communication with the machine learning results evaluator, results of the comparison between the system performance improvement evaluator and the machine learning results evaluator can be sent to the unified user interface, and on to the data collector and processed in the data compiler. The comparison can be employed to ascertain the effectiveness of the machine learning system, and results can be used to improve the machine learnings based on techniques known to those of ordinary skill in the art.

Figure 5:
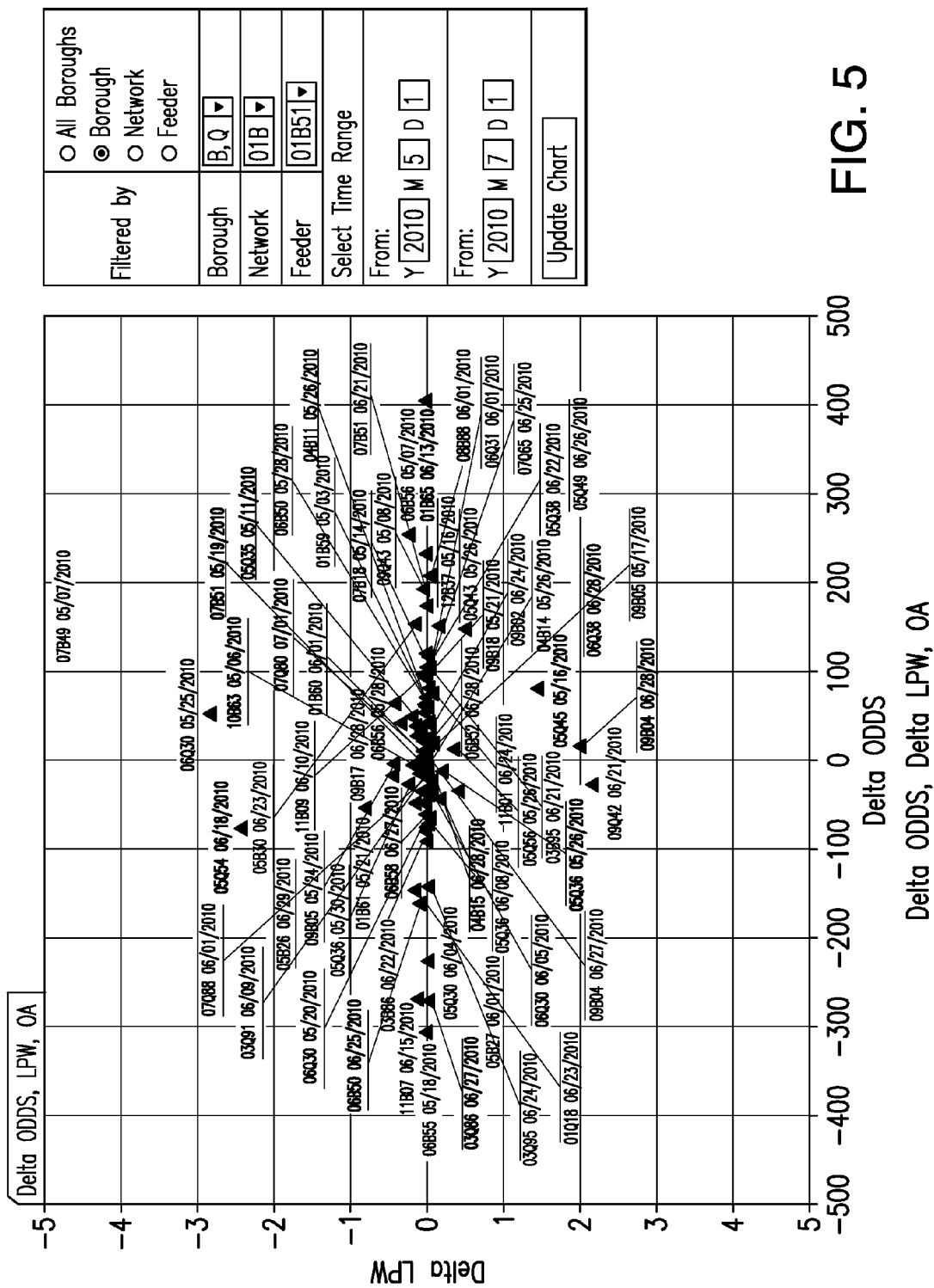
FIG. 5 depicts an auxiliary metrics chart for machine learning results evaluator, which shows a daily delta LPW (i.e., load pocket weight, one of the influential network component data attributes) versus daily delta ODDS ranking generated by the machine learning.

FIG. 5 illustrates an auxiliary metrics chart for machine learning results evaluator (350). It shows a daily delta LPW (i.e., load pocket weight, one of the influential network component data attributes) versus daily delta ODDS ranking generated by the machine learning. Only the data points for the specific feeders/network/borough one day before any outage happening are displayed because these data points are predictive precursor information. Beside each triangular data point is a designation which indicates which network component the data represents, and the date. The time range selection at the right limits the date range for the outages. The scatter points at the upper left quadrant of the plot indicate highly risky components, in this case, feeder.

Figure 6:
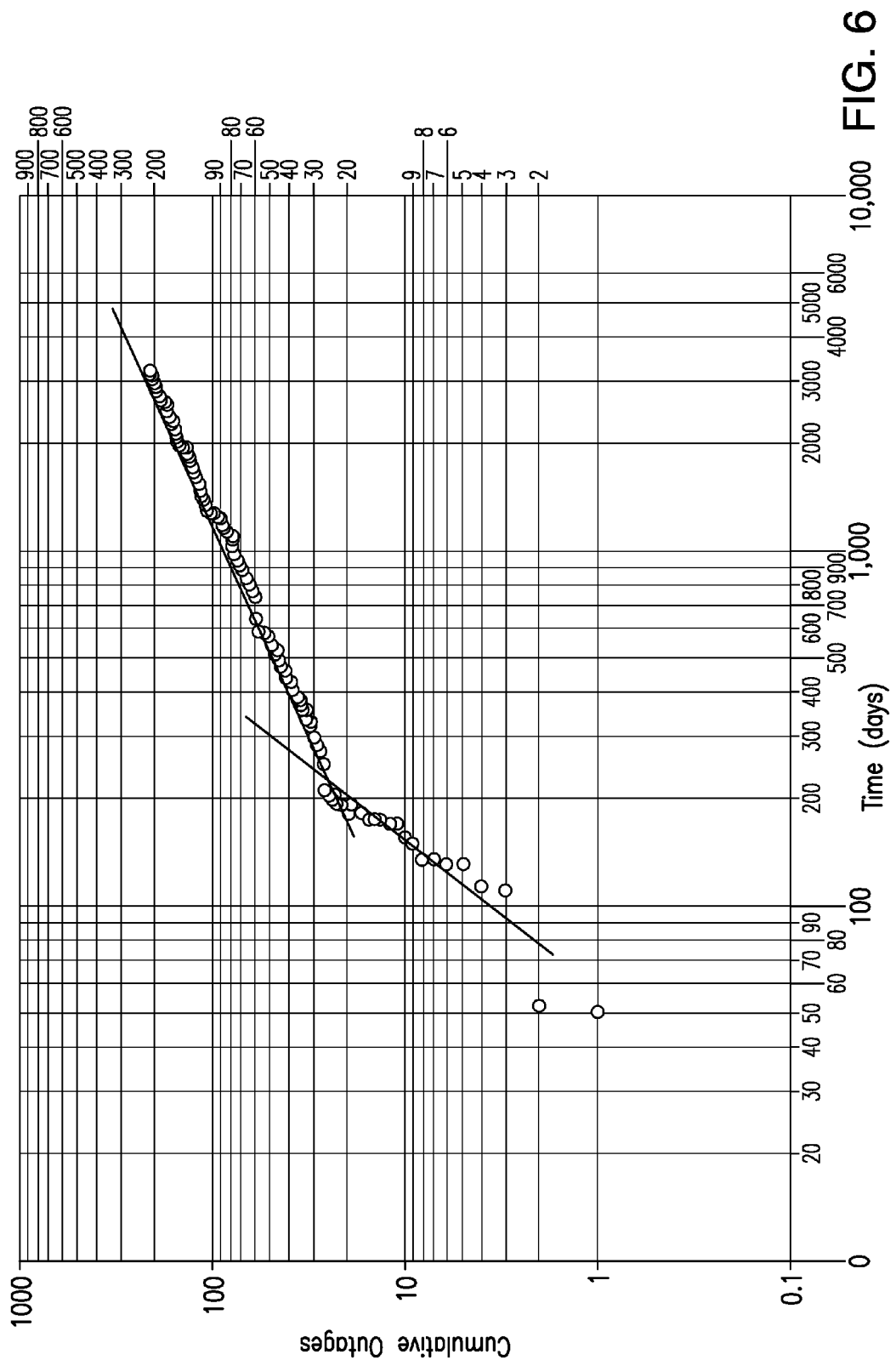
FIG. 6 depicts a log(cumulative outages) versus log(time) chart employed by the system performance improvement evaluator that can be used to see the changes in the time gap between failures upon implementing a change to the infrastructure recommended by the machine learning.

For specific embodiments that employ a longer time horizon, a log(cumulative outages) versus log(time) chart can be used to see the changes in the time gap between failures, as shown in FIG. 6. This graphical analysis is also called a Duane plot, which is a log-log plot of the cumulative number of failures versus time. See Gaudoin, O.; Yang, B.; and Xie, M., A simple goodness-of-fit test for the power-law process, based on the duane plot. IEEE Transactions on Reliability 52(1):69-7 (2003). As illustrated in FIG. 6, the changing slope of the regression lines of the cumulative outages, which is the failure rate (described below) shows the improved rate of outages to an electrical grid. If the outages occurred at the same time, the log-log plot shown in FIG. 6 would show a straight line.

Figure 7:
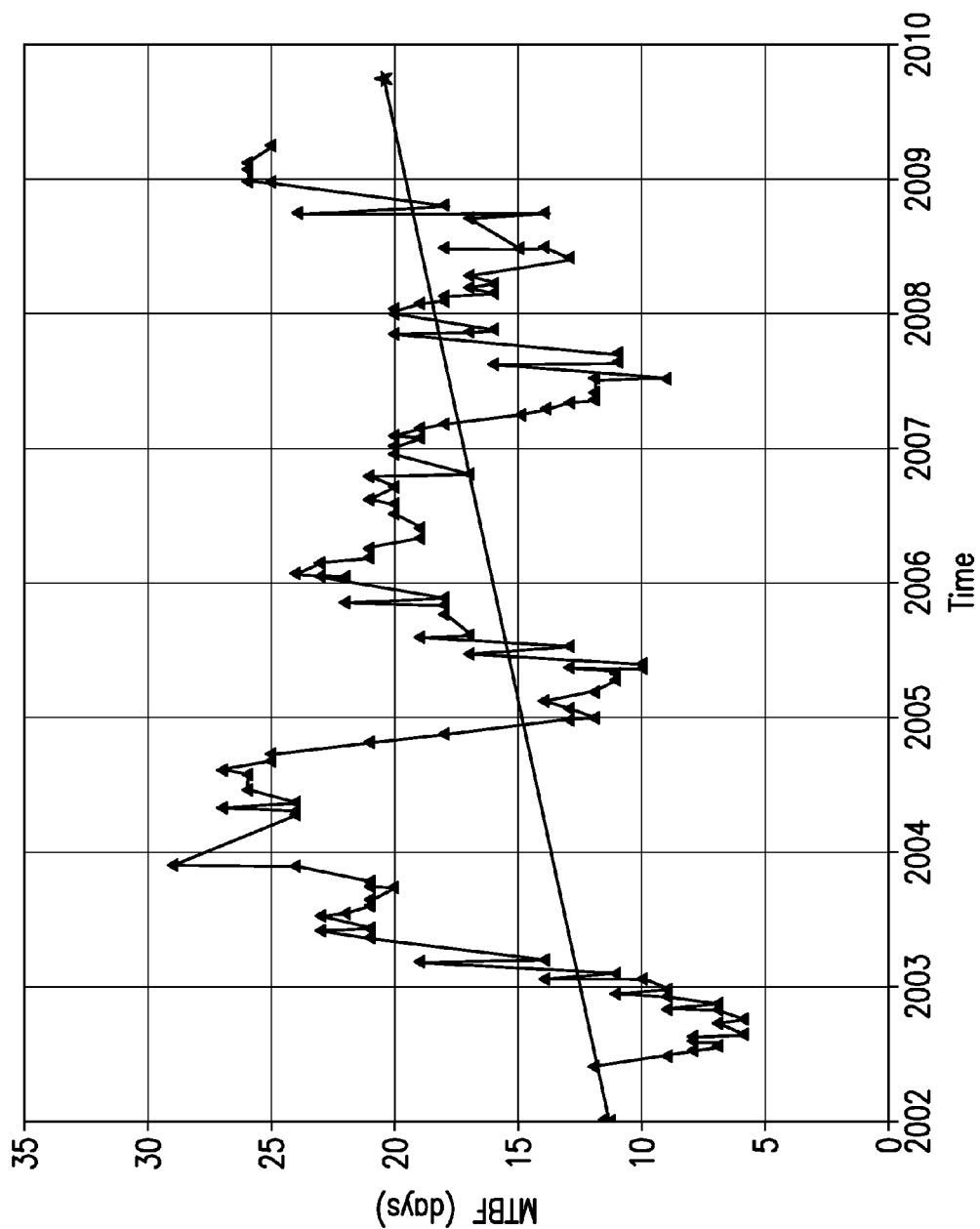
FIG. 7 depicts an auxiliary metrics chart for system performance improvement evaluator. The left chart shows LPW (i.e., load pocket weight, one of the influential network component data attributes) versus ODDS ranking generated by the machine learning for the selected network. The data points at the top left quadrant shows network components (feeders) with highest risk. The right chart shows Outage (OA) and PQ (Power Quality) events for the same network during the past five days.

Two of the more precise metrics for evaluating system improvement in reliability are Mean Time Between Failures (MTBF) and failure rate. MTBF is the predicted lapsed time between failures. Failure rate is the frequency in which system fails. For a system with constant failure rate, i.e., the time between failures has an exponential distribution, the MTBF can be calculated as the arithmetic mean (average) time between failures of a system and the failure rate is the multiplicative inverse of MTBF. FIG. 7 illustrates a MTBF time series for all the feeders in a specific electrical network for the period from 2002 to 2009 and the linear regression. The MTBF estimates can be used to show the rate of improvements.

Figure 8:
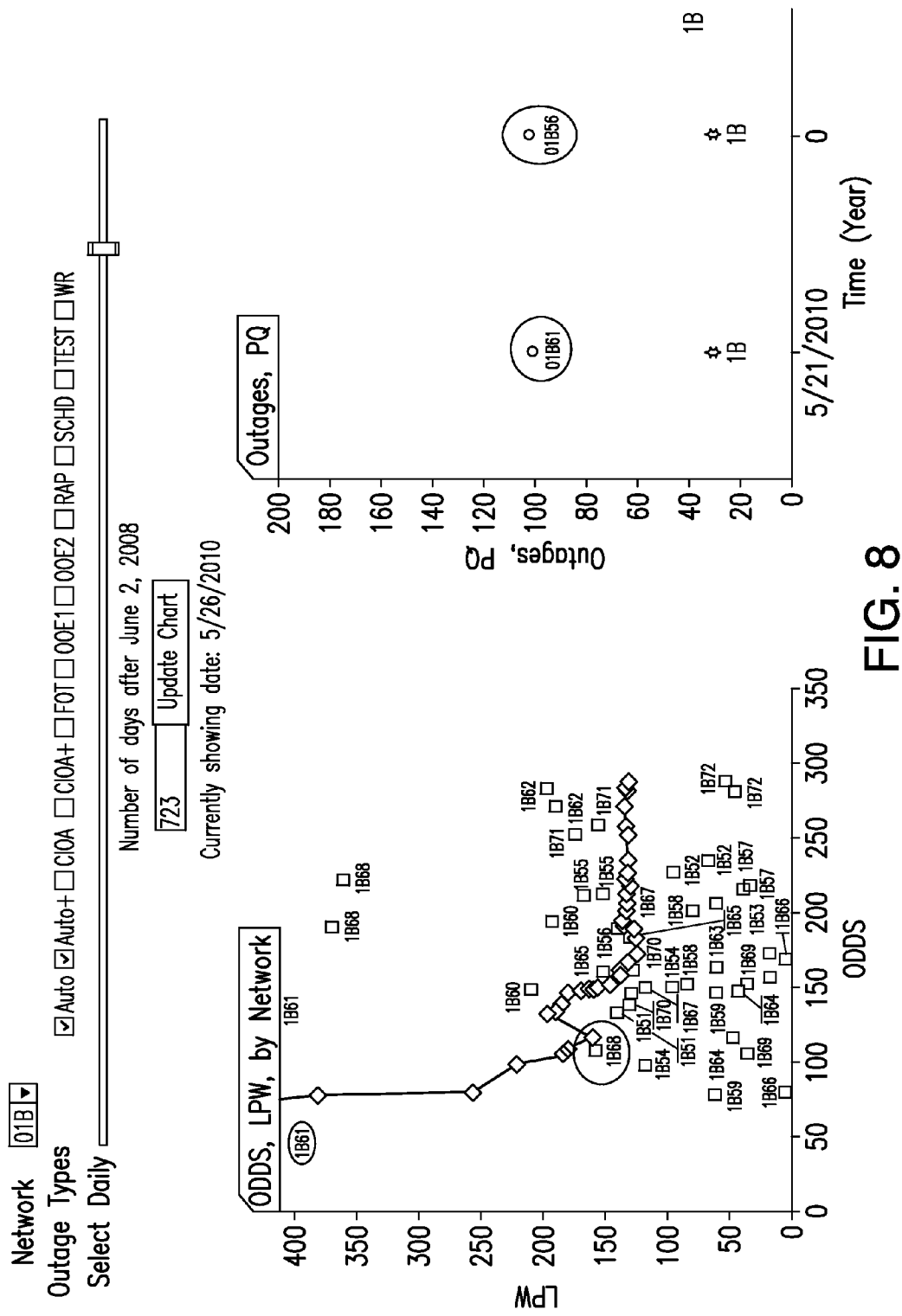
FIG. 8 depicts a MTBF (mean time between failure) time series for all the feeders in a specific network for the period from 2002 to 2009 and the linear regression. The MTBF estimates can be used to show the rate of improvements.

FIG. 8 illustrates an auxiliary metrics chart for system performance improvement evaluator (450). The left chart shows LPW (i.e., load pocket weight, one of the influential network component data attributes) versus ODDS ranking generated by the machine learning for the selected network. Beside each data point is a designation to indicate the network component that the data represents. The data points at the top left quadrant shows network components (feeders) with highest risk. Representative feeders 1B61 (upper most) and 1B56 are circled. The right chart shows Outage (OA) and PQ (Power Quality) events for the same network during the past five days. On this snapshot, the feeders (circled) showing at the top left on the left chart are concurring to the events on the right chart. In the right chart, data points for feeder 1B61 (to the left) and 1B56 (to the right) are also circled. The time slider and input box at the top can be used to select specific date of interest, similar to a replay of the past daily snapshots in a continuous movie mode. The outage types can be used to include or exclude certain types of outages showing on the chart at the right. This chart gives a good visual presentation of the system performance (Outages, PQ events) via a moveable time series plot, and enables comparison between the actual system events/facts with the machine learning results (at the left), all on the same page.

Unified User Interface

With reference to FIG. 1, the evaluation results from the input data evaluator (150), the machine learning results evaluator (350) and the system performance improvement evaluator (450) are eventually directed to an unified visualization-aided user interface—a centralized software dashboard that displays information, from the above evaluators for users of the presently disclosed system. For the abnormal results that triggered the pre-defined thresholds, warning messages or alert emails will be dispatched automatically to users so that the smooth operation of the real-time system can be ensured. This step further closes the loop and links the evaluation processes back to the machine learning system.

Table 1 below summarizes components of the presently disclosed system.

TABLE 1

Summary of exemplary data techniques and display methods for System Components

| Component | Evaluation target | Methods, metrics, charts |
|---|---|---|
| Input Data Evaluator | Input data | Sparkline graph, data checks and constraints |
| Machine Learning Evaluator | Machine learning results | ROC curve, AUC time series |
| System Performance Improvement Evaluator | Physical system improvements | Duane plot, MTBF, failure rate, linear regression |
| Unified User Interface | Unified user interface | Dashboard, charts, triggers, warning messages, alert emails |

Scorecards for Empirical Record

In one non-limiting embodiment, the presently disclosed system contains a dashboard that includes at least one or from one to up to 10 or 12 or more scorecards that maintain an unbiased "brutally empirical" record over time of the status of the electrical grid's performance versus the costs and investments made to produce those improvements. The system monitors the cause-and-effect implications of operational field actions and validates whether actual performance matches that expected from efficient frontier planning. The system continuously compiles electronic scorecards, including but not exclusive to, the following 12 recommended metrics:

1. Measurement of the actual number if Open Auto feeder failures versus that predicted by the Machine Learning Feeder Susceptibility to Impending Failure Model. (See, e.g., U.S. Published Application No. 2009/0157573, which is hereby incorporated by reference).
2. Measurement of improvement in Feeder Component Susceptibility to Impending Failure determined from Machine Learning rankings versus random failure when plotted as the Cumulative % of Open Auto component failures in continuous running time windows (in the form of Receiver-Operator-Curves).
3. Measurement of improvement in Feeder Susceptibility to Impending Failure versus System Electrical Load and Load Pocket Weight in continuous running time window. Feeder Open Auto emergency failures and Power Quality events are also displayed as specific events.
4. Measurement of the continuously changing risk status in Networks and Feeders intended to improve Load Pocket Weight and Feeder Susceptibility to Impending Failure.
5. Measurement of Prevented Failures per Network over time.
6. Histograms of the number of Prevented Failures per Network, and Mean Time Between Feeder Failures per Network.
7. Histograms of cumulative investment in work done on each network within the electrical grid, and the Number of Prevented Failures resulting from that work.
8. Measurement of Mean Time Between Failures (MTBF) by Network versus Costs in each Network over time.
9. Measurement of Cumulative Cost per percent delta Mean Time Between Failures of all feeders in each Network versus Years to Network Reliability Index of each Network over time.
10. Measurement of Cost/Benefit ratio after field work versus predicted Cost/Benefit Metrics for the Efficient Frontier of Investment designed to increase reliability.
11. Measurement of Efficiency of Investment determined by the inflection in the curve fit of a plot of MTBF Improvement versus estimated Cumulative cost.
12. Measurement of recommended Efficient Frontier expenditures to maximize Strategic Value versus actual capital investment outcomes.

These new metrics can be combined with, for example, CAIDI (Customer Average Interruption Duration Index), SAIFI (System Average Interruption Frequency Index), and MAIFI (Momentary Average Interruption Frequency Index) to present a complete view of the performance of an electrical grid along with the traditional improvement monitoring methods. The combination of these new scorecards with the traditional utility performance metrics, plus additional metrics not exclusive to this discovery, will allow the scoring of management and financial decisions made by the utility to smarten the electric grid in terms of the effectiveness of the outcomes of the overall system.

The system also feeds back these performance levels in real time as a critic function to correct the predictive models in the Adaptive Stochastic Controller so that the overall system learns more and more optimal decisions over time. Certain embodiments of the presently disclosed subject matter utilize the stochastic controller technology disclosed in U.S. Pat. No. 7,395,252, granted Jul. 1, 2008 and hereby incorporated by reference in its entirety.

In various embodiments, the infrastructure to which the capital asset planning system and methods of the presently disclosed subject matter can be applied to is without limitation. In one embodiment, the infrastructure is selected from the group consisting of a chemical processing operation, a petroleum refining operation, a product manufacturing operation, a telecommunication grid, a transportation infrastructure, a gas network, a commodity pipeline network, and a water treatment network.

In one embodiment, the infrastructure is an electrical grid. Data sources descriptive of the electrical grid include one or more of data representative of at least one of electrical feeder data, electrical cable data, electrical joint data, electrical transformer data, electrical outage data, electrical test pass or fail data, electrical load data, and past capital improvement cost data.

Example

The present application is further described by means of the examples, presented below. The use of such examples is illustrative only and in no way limits the scope and meaning of the invention or of any exemplified term. Likewise, this application is not limited to any particular preferred embodiments described herein. Indeed, many modifications and variations of the invention will be apparent to those skilled in the art upon reading this specification. The invention is to be understood by the terms of the appended claims along with the full scope of equivalents to which the claims are entitled.

The presently disclosed system was to conduct comparative empirical studies on MartaRank and ODDS feeder ranking systems. The results obtained from the presently disclosed system have helped machine learning researchers to better compare the performance of these two systems. The presently disclosed system integrated evaluation process can also be used to ensure that the real-time systems run as expected and the power grid operators can rely on the ranking to plan maintenance operations, or if the recommended changes have already been implemented, to analyze the accuracy of the improvements to the infrastructure that is predicted from the machine learning.

One experimental result we concluded from the evaluation using the presently disclosed system is the increasing MTBF, i.e., lower failure rate and better system reliability, for most networks. Table 2 lists the total number of feeder failures in a mature electrical grid in the Northeastern U.S. from year 2005 to year 2009.

TABLE 2

Electrical feeder failures in an electrical grid

| Year | Number of Feeder Failures |
|---|---|
| 2005 | 1612 |
| 2006 | 1547 |
| 2007 | 1431 |
| 2008 | 1239 |
| 2009 | 1009 |

Figure 9:
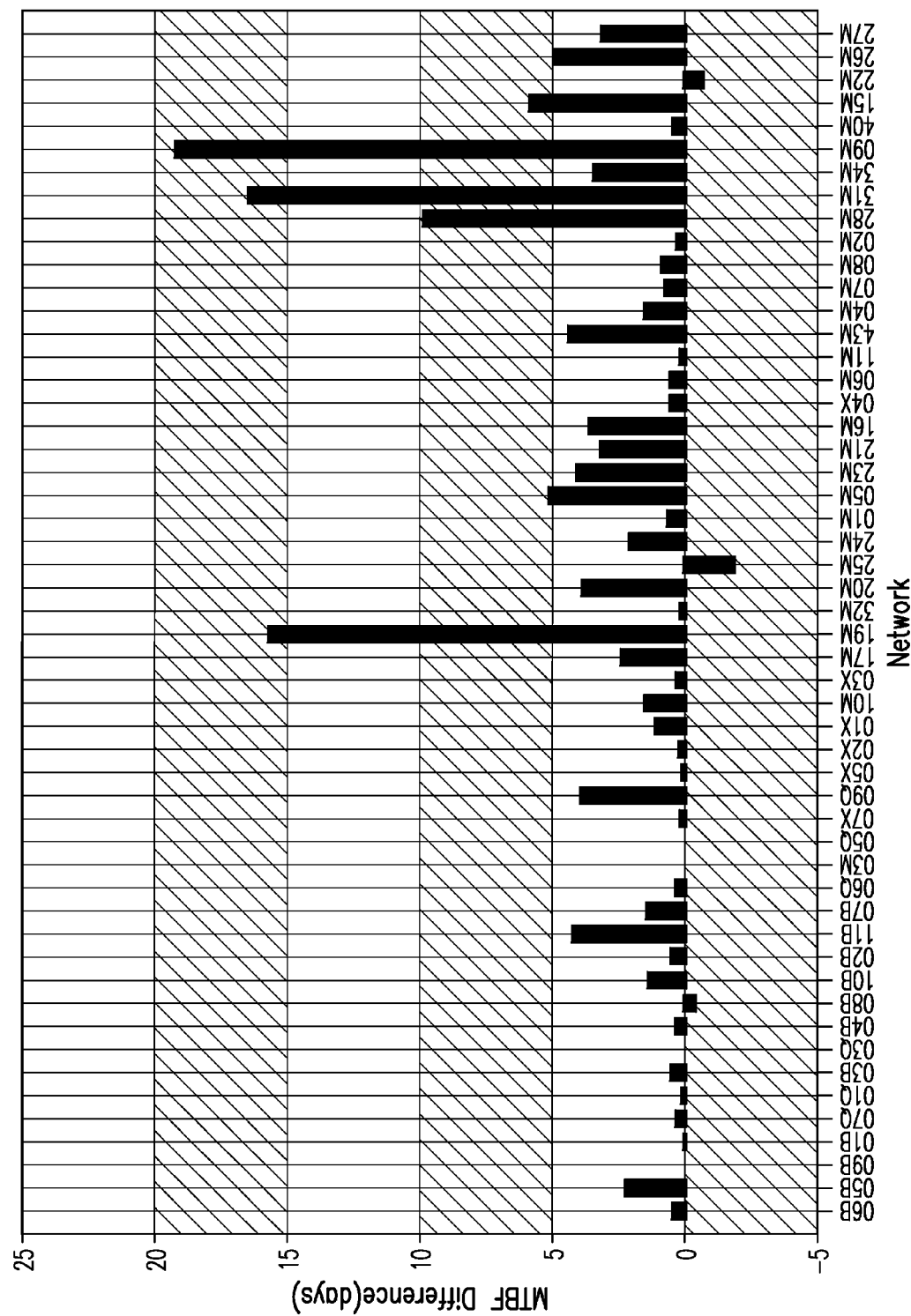
FIG. 9 depicts the MTBF differences between year 2002 and year 2009 for each network. The bars with values above zero indicate MTBF improvements.

The decreasing number of feeder failures shows that the feeder rankings produced by the machine learning have been effective and led to fewer feeder failures, which in turn led to fewer outages of the power network. FIG. 9 illustrates the MTBF differences between year 2009 and year 2002 for each network. The bars with values above zero indicate MTBF improvements. The majority of the networks saw significant increase of MTBF.

Figure 10:
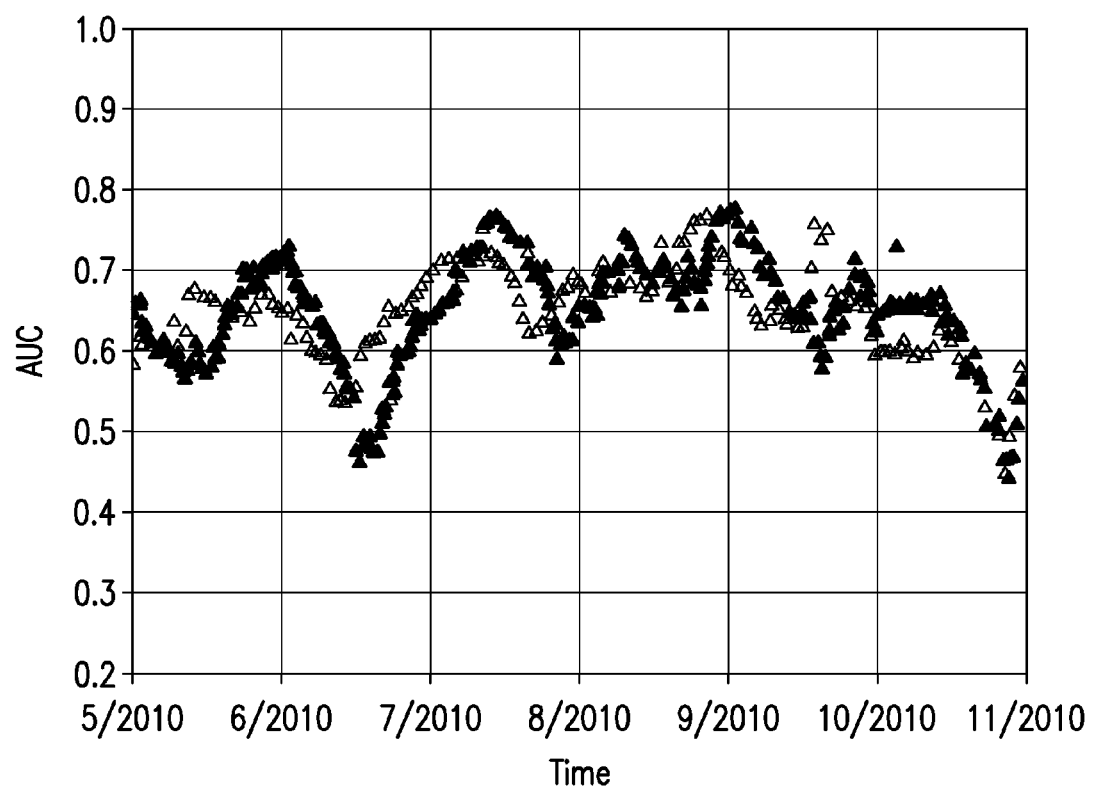
FIG. 10 depicts the AUC time series of ODDS and MartaRank machine learning systems, both for the time period from May 2010 to November 2010.

One phenomenon that was identified based on the results from the presently disclosed system is the AUC cyclicity that appears in both feeder ranking systems, which have quite different internal machine learning algorithms and methods. FIG. 10 shows the AUC time series of ODDS and MartaRank machine learning systems, both for the time period from May 2010 to November 2010. Although the two AUC time series vary differently, they both inherently resemble some sort of similar cycles, which we dubbed the cyclicity challenge.

The presently disclosed systems and methods can include software modules running on a computer, one or more processors, or a network of interconnected processors and/or computers each having respective communication interfaces to receive and transmit data. Alternatively, the software modules can be stored on any suitable computer-readable medium, such as a hard disk, a USB flash drive, DVD-ROM, optical disk or otherwise. The processors and/or computers can communicate through TCP/IP, UDP, or any other suitable protocol. Conveniently, each module is software-implemented and stored in random-access memory of a suitable computer, e.g., a work-station computer. The software can be in the form of executable object code, obtained, e.g., by compiling from source code. Source code interpretation is not precluded. Source code can be in the form of sequence-controlled instructions as in Fortran, Pascal or "C", for example.

Various modifications and alterations to the described embodiments will be apparent to those skilled in the art in view of the teachings herein. For example, hardware, such as firmware or VLSICs (very large scale integrated circuit), can communicate via a suitable connection, such as one or more buses, with one or more memory devices.

Additional details regarding the machine learning techniques that can be used in accordance with the presently disclosed systems and methods can be found in U.S. Pat. No. 7,395,252, which is hereby incorporated by reference.

The presently disclosed subject matter is not to be limited in scope by the specific embodiments described herein. Indeed, various modifications of the disclosed subject matter in addition to those described herein will become apparent to those skilled in the art from the foregoing description and the accompanying figures. Such modifications are intended to fall within the scope of the appended claims.

It is further to be understood that all values are approximate, and are provided for description.

Patents, patent applications, publications, product descriptions, and protocols are cited throughout this application, the disclosure of each of which is incorporated herein by reference in its entirety for all purposes.

The invention claimed is:

1. A system for evaluating the accuracy of a predicted effectiveness of an improvement to an infrastructure based on data collected from the infrastructure during a first time period before a change to an infrastructure has been implemented and a second time period after the change to the infrastructure has been implemented, the collected data including information representative of at least one pre-defined metric of the infrastructure, comprising:
 (a) a data collector for collecting the data from the infrastructure during the first time period and the second time period, wherein the data meets at least one predetermined threshold requirement;

(b) a compiler, adapted to receive and compile, via one or more processors, the collected data to generate compiled data representative of the first time period and compiled data representative of the second time period;

(c) an input data evaluator, adapted to evaluate, via one or more processors, the compiled data and provide the compiled data to a machine learning system if the compiled data meets the at least one predetermine threshold requirement;

(d) a machine learning system, coupled to the compiler and adapted to receive the complied data representative of the first time period therefrom and generate, via the one or more processors, corresponding machine learning data;

(e) a machine learning results evaluator, coupled to the machine learning system, to empirically analyze, via the one or more processors, the generated machine learning data;

(f) an implementer to implement the change to the infrastructure, wherein the change to the infrastructure is based at least in part on the machine learning data, and;

(g) a system performance improvement evaluator, coupled to the compiler and adapted for receiving the compiled data representative of the first time period and the compiled data representative of the second time period therefrom, and coupled to the machine learning system and adapted for receiving the generated machine learning data therefrom, for:

(i) comparing the compiled data representative of the first time period to the compiled data representative of the second time period to determine a difference, if any, and (ii) comparing the difference, if any, determined in (i) to a prediction based on the generated machine learning data.

2. The system of claim 1, further comprising a unified user interface in communication with at least one of the machine learning results evaluator and the system performance evaluator.

3. The system of claim 2, further comprising an input data evaluator, in communication with the data compiler, to determine if the compiled collected data meets at least one predetermined threshold requirement representative of data quality.

4. The system of claim 3, wherein the input data evaluator is in communication with the unified user interface.

5. The system of claim 3, wherein the machine learning system receives only data that meets the at least one predetermined threshold requirement representative of data quality.

6. The system of claim 1, wherein the infrastructure is an electrical grid.

7. The system of claim 4, wherein the input data evaluator sends to the unified user interface a sparkline graph.

8. The system of claim 2, wherein the machine learning results evaluator sends to the unified user interface at least one of a ROC Curve, or an Area under a ROC curve.

9. The system of claim 6, wherein the machine learning data results evaluator outputs a list of electrical feeders ranked according to their susceptibility to failure.

10. A method for evaluating the accuracy of a predicted effectiveness of an improvement to an infrastructure based on data collected from the infrastructure during a first time period before a change to an infrastructure has been implemented and a second time period after the change to the infrastructure has been implemented, the collected data including information representative of at least one pre-defined metric of the infrastructure, comprising:

(a) collecting data from the infrastructure during the first time period and the second time period, wherein the data meets at least one predetermined threshold requirement;

(b) compiling the collected data to generate compiled data representative of the first time period and compiled data representative of the second time period;

(c) providing the compiled data to a machine learning system if the compiled data meets the at least one pre-determine threshold requirement;

(d) performing machine learning on the compiled data representative of the first time period and generating corresponding machine learning data;

(e) storing and empirically evaluating the generated machine learning data;

(f) implementing the change to the infrastructure, wherein the change to the infrastructure is based at least in part on the generated machine learning data, and (g) receiving the compiled data representative of the first time period and the compiled data representative of the second time period therefrom, for:

(i) comparing the compiled data representative of the first time period to the compiled data representative of the second time period to determine a difference, if any, and (ii) comparing the difference, if any, determined in (i) to a prediction based on the generated machine learning data.

11. The method of claim 10, further comprising communicating output from at least one of the machine learning results evaluator and the system performance evaluator to a unified user interface.

12. The method of claim 11, further comprising evaluating input data to determine if the compiled collected data meets at least one predetermined threshold requirement representative of data quality.

13. The method of claim 12, further comprising communicating the evaluated input data to the unified user interface.

14. The method of claim 13, wherein the machine learning receives only data that meets the at least one predetermined threshold requirement representative of data quality.

15. The method of claim 10, wherein the infrastructure is an electrical grid.

16. The method of claim 15, wherein the generated machine learning includes a list of electrical feeders ranked according to their susceptibility to failure.

17. A method of evaluating the accuracy of a predicted effectiveness of an improvement to an infrastructure, comprising:

(a) collecting data from the infrastructure during a first time period and a second time period, wherein the data meets at least one predetermined threshold requirement;

(b) compiling the collected data to generate compiled data representative of the first time period and compiled data representative of the second time period;

(c) providing the compiled data to a machine learning system if the compiled data meets the at least one pre-determine threshold requirement;

(d) performing machine learning on the compiled data representative of the first time period and generating corresponding machine learning data;

(e) storing and empirically evaluating the generated machine learning data;

(f) implementing the change to the infrastructure, wherein the change to the infrastructure is based at least in part on the generated machine learning data, and (g) receiving the compiled data representative of the first time period and the compiled data representative of the second time period therefrom, for:
  (i) comparing the compiled data representative of the first time period to the compiled data representative of the second time period to determine a difference, if any, and
  (ii) comparing the difference, if any, determined in (i) to a prediction based on the generated machine learning data.

18. The method of claim 17, wherein the infrastructure is an electrical grid.

19. The method of claim 18, wherein the predicted effectiveness of the improvement to the infrastructure is obtained based at least in part from machine learning.

20. The method of claim 19, wherein the machine learning receives only data that meets the at least one predetermined threshold requirement representative of data quality.

* * * * *